United States Patent
Anderson et al.

(10) Patent No.: US 7,268,970 B2
(45) Date of Patent: Sep. 11, 2007

(54) METHOD AND APPARATUS FOR STORING DATA ON MAGNETIC TAPE

(75) Inventors: James Clifford Anderson, Eagle, ID (US); Martin John Harper, Boise, ID (US); Vernon L. Knowles, Boise, ID (US); Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 141 days.

(21) Appl. No.: 10/719,515

(22) Filed: Nov. 20, 2003

(65) Prior Publication Data

US 2005/0111131 A1    May 26, 2005

(51) Int. Cl.
G11B 5/584 (2006.01)
G11B 15/04 (2006.01)
G11B 21/02 (2006.01)

(52) U.S. Cl. .................. 360/77.12; 360/75; 360/60

(58) Field of Classification Search .......... 360/69, 360/70, 75, 76, 77.01, 77.12
See application file for complete search history.

(56) References Cited

U.S. PATENT DOCUMENTS

| 5,828,514 | A  | * | 10/1998 | Chliwnyj et al. | ........ 360/77.12 |
| 6,449,114 | B1 | * | 9/2002  | Nagasawa        | ............ 360/69 |
| 6,633,448 | B1 | * | 10/2003 | Smith et al.    | ............ 360/69 |
| 2002/0063989 | A1 |   | 5/2002  | White           |                     |
| 2003/0067703 | A1 | * | 4/2003  | Holmes et al.   | ............ 360/69 |
| 2005/0057843 | A1 | * | 3/2005  | Egan            | ............ 360/71 |

FOREIGN PATENT DOCUMENTS

| EP | 0877372 A2 | 11/1998 |
| JP | 6074299 | 3/1994 |
| JP | 2003-085720 A | 3/2003 |
| WO | WO 0231827 A2 | 4/2002 |

* cited by examiner

Primary Examiner—William Korzuch
Assistant Examiner—Jason Olson

(57) ABSTRACT

Electromagnetic tape head position is adjusted according to vibration indicative information received from vibration sensor secured to tape transport mechanism that supports the tape head.

36 Claims, 9 Drawing Sheets

METHOD AND APPARATUS FOR STORING DATA ON MAGNETIC TAPE

BACKGROUND

Information is recorded on and read from a moving magnetic tape with an electromagnetic read/write head positioned next to the magnetic tape. The electromagnetic "head" may be a single electromagnetic head or, as is common, a series of read/write electromagnetic head elements stacked individually and/or in pairs within the head unit. Data is recorded in tracks on the magnetic tape by moving the magnetic tape lengthwise past the electromagnetic head. The electromagnetic head elements are selectively activated by electric currents representing the information to be recorded on the magnetic tape. The information is read from the magnetic tape by moving the magnetic tape longitudinally past the electromagnetic head elements. Magnetic flux patterns on the magnetic tape create electric signals in the electromagnetic head elements as the magnetic tape moves along. These electrical signals represent the information stored on the magnetic tape.

Data is recorded on or read from each of the parallel tracks on the magnetic tape by positioning the electromagnetic head elements at different locations across the magnetic tape. Electromagnetic head elements are moved from track to track, as necessary, either to record or to read the desired information. A head position actuator operatively coupled to servo control circuitry controls movement of the electromagnetic head according to servo information recorded on the magnetic tape. Tape drive head positioning actuators often include a lead screw driven by a stepper motor, a voice coil motor, or a combination of both. The head position actuator moves the electromagnetic head along a path perpendicular to the direction of travel of the magnetic tape. The electromagnetic head elements are positioned as close to the center of a track as possible based upon the servo information.

Two important considerations in the operation of tape drives are read errors and write errors. Read errors occur when data incorrectly is read from the magnetic tape; write errors occur when data is incorrectly written onto the magnetic tape. Tape storage protocols often include error-detection mechanisms that enable detection of a read error. When a read error is detected, the magnetic tape can be stopped and backspaced so that the data can be re-read. This view of read errors assumes that data has been stored on the magnetic tape correctly and that the error occurred during the read operation. If data was not stored on the magnetic tape correctly in the first place, then correcting the erroneously written data during the read process is very difficult. Write errors, therefore, are more serious than read errors. A simple write mechanism has no way to verify that the data has been correctly transferred to the magnetic tape.

Two contributors to read/write errors are shock and vibration that result from incidental, intended, or unintended motion of a tape transport mechanism in the tape drive during operation. The tape transport mechanism typically is housed in the body of the tape drive. Any shock and vibration applied to the body of the tape drive couples mechanically to the tape transport mechanism and therefore to the electromagnetic head. Such disturbances that occur during a write process can cause misalignment between the electromagnetic head and the tape track to which data is being written. This misalignment increases the chance that a write error will occur. Similar disturbances that occur during a read process also can cause read errors.

Because write errors are more serious than read errors, electromagnetic head assemblies often comprise a pair of elements, a "front" electromagnetic head and a "back" electromagnetic head, separate from each other, but closely spaced together. These assemblies operate by writing data to the magnetic tape with the front electromagnetic head and then immediately reading the just-written data from the magnetic tape with the back electromagnetic head. If the data read matches the data written, then the data on the magnetic tape is assumed to be correct. If the two versions of the data do not match, then corrective action can be taken. One form of corrective action writes a mark on the magnetic tape that identifies the errored data as invalid and then rewrites the data onto a different part of the magnetic tape.

Unfortunately, the write-read technique can be fooled by shock and vibration applied to the body of the tape drive. The write and read electromagnetic heads employed in the write-read method are rigidly connected to each other and undergo essentially identical motion in response to any shock or vibration that reaches the tape transport mechanism that supports the electromagnetic head. Therefore, if shock or vibration causes the front electromagnetic head to write data to an incorrect location on the magnetic tape, then the confirming data read by the back electromagnetic head comes from the same incorrect location, and no error is detected. Upon playback of the same data, however, a read error may occur because the read electromagnetic head may not be aligned to the same position on the magnetic tape as when the data was written in the presence of shock or vibration. Even in the absence of a write error, shock or vibration that occur during a read operation can cause momentary misalignment of the electromagnetic head and the magnetic tape, thus causing a read error.

To summarize, shock and vibration during a write operation can lead to data that is erroneously written onto magnetic tape, and the resulting errors may not be detected by the write-read technique. Shock and vibration that occur during a read operation can lead to read errors regardless of the quality of the data on the magnetic tape.

SUMMARY

A method and apparatus are disclosed for storing data on and retrieving data from magnetic tape by receiving data when operating in a write mode, passing magnetic tape across an electromagnetic head, and varying drive current to the electromagnetic head according to the data when operating in a write mode. Current induced in the electromagnetic head is sensed when operating in a read mode. Vibration imparted to a tape transport mechanism is sensed, and position of the electromagnetic head is adjusted according to the sensed vibration.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
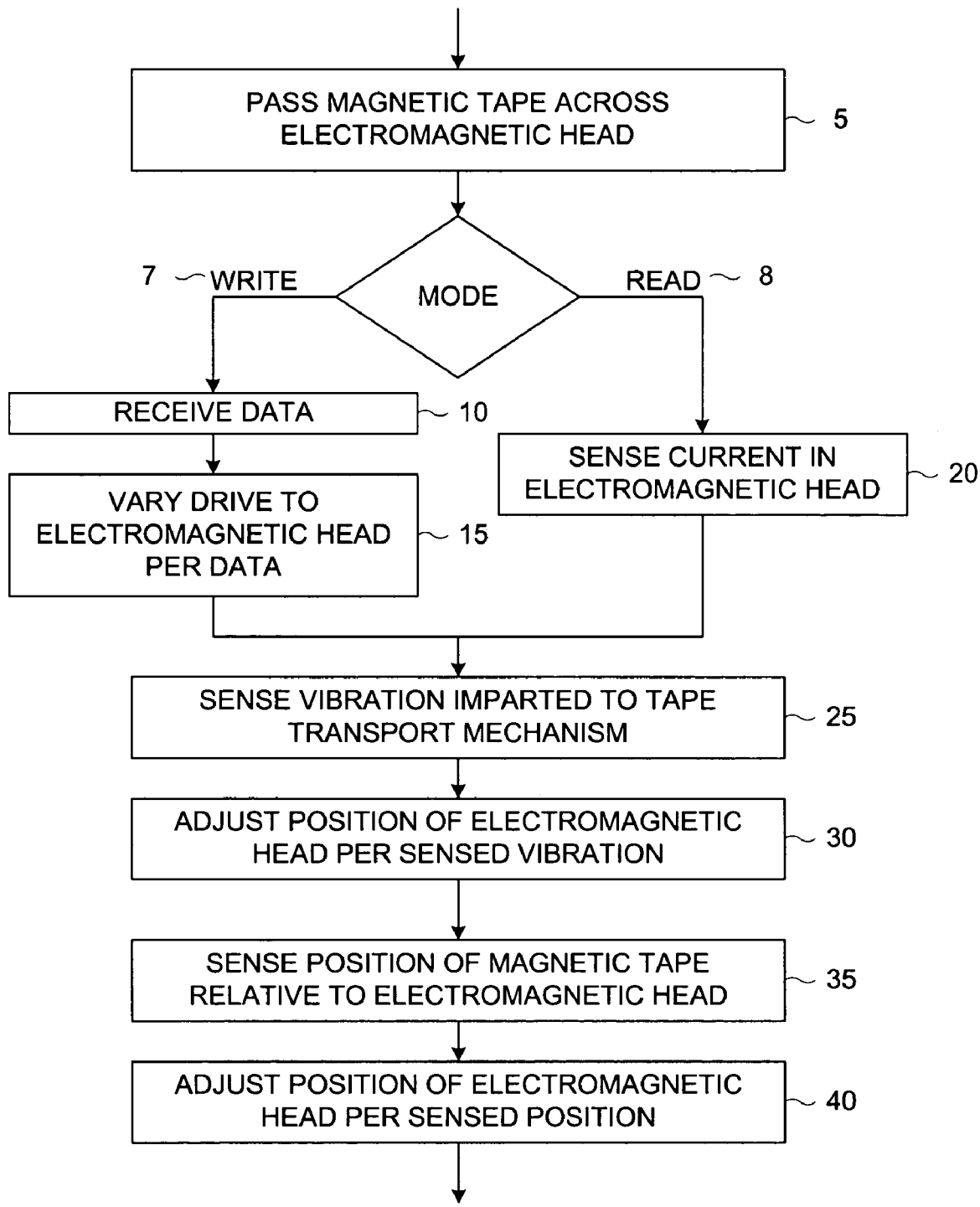
FIG. 1 is a flow diagram of a representative embodiment of a method for storing data on and receiving data from a magnetic tape.

FIG. 1 is a flow diagram of a representative embodiment of a method for storing data on and receiving data from a magnetic tape. According to this example method, the tape is passed across an electromagnetic head (step 5). According to one exemplary variation of the present method, operation proceeds in a write mode (step 7). When operating in a write mode, data that is to be stored on the magnetic tape is received (step 10). Drive current to the electromagnetic head is varied according to the data (step 15). Typically, the magnetic tape is impregnated with magnetic material. One example of such material is finely powdered iron. Each of the tiny particles of magnetic material in the magnetic tape functions as a microscopic magnet having a North and South pole. The data to be recorded on the magnetic tape often is encoded in binary form as, for example 1's and 0's. In one illustrative example, a 1 is encoded as a positive current and a 0 is encoded as a negative current. According to another example, the drive current in the electromagnetic head is varied between positive and negative according to the binary data. When a positive drive current is applied to the electromagnetic head, according to one illustrative example, the magnetic tape material that is near the head is magnetized to a North magnetic state. Similarly, when a negative drive current is applied to the electromagnetic head, according to the same illustrative example, the magnetic tape material that is near the head is magnetized to a South magnetic state.

According to another exemplary variation of the present method, operation proceeds in a read mode (step 8). According to well-established principles of electromagnetism, the motion of the tape past the electromagnetic head induces a voltage signal in the electromagnetic head according to the magnetic state of the magnetic tape material near the head. This voltage signal causes a current in the electromagnetic head that varies according to the data stored on the magnetic tape. This current in the electromagnetic head is sensed (step 20), when operating in a read mode, in order to read data from the tape.

It should be understood that practical tape drives perform the above operations millions of times per second. Additionally, the tracks on magnetic tape are very small. As a result, as described herein, any shock or vibration experienced by the electromagnetic head can lead to brief misalignment of the electromagnetic head and the magnetic tape. This misalignment can lead to errors, either while writing to or while reading from the magnetic tape. Accordingly, the present example method further comprises sensing the vibration imparted to a tape transport mechanism that supports the electromagnetic head (step 25). The position of the electromagnetic head is adjusted according to the sensed vibration (step 30).

One source of vibration (or shock) is an object or person bumping a body of a tape drive. Vibration from nearby electric motors also can give rise to vibration of the body of a tape drive. If the vibration of the body of the tape drive couples to the tape transport mechanism that supports the electromagnetic head, then a potential for errors exists. The present method is directed to countering the effects of vibration applied to a tape transport mechanism that supports an electromagnetic head.

According to one alternative variation of the present method, vibration is sensed by generating an electrical signal according to the vibration experienced by the tape transport mechanism that supports the electromagnetic head. One example method for sensing vibration comprises attaching an accelerometer to the tape transport mechanism. The accelerometer generates an electrical signal according to the vibration experienced by the accelerometer. Because the accelerometer is attached to the tape transport mechanism that supports the electromagnetic head, the signal produced by the accelerometer represents the vibration experienced by the tape transport mechanism. According to one typical example, the accelerometer signal is used by a head positioning unit to adjust the position of the head according to the accelerometer signal.

Properly positioning an electromagnetic head relative to a magnetic tape is not a simple matter even in the absence of vibration. For example, the magnetic tape in some tape drives tends to wander back and forth because of irregularities in the shapes of guides that are intended to keep the magnetic tape properly aligned with the electromagnetic head. Sometimes, a thin film of air can form between the magnetic tape and the guide. In this situation, the magnetic tape tends to float on this film of air. This floating causes the magnetic tape to move laterally across the electromagnetic head. If the magnetic tape moves too far from its proper position, then the magnetic tape becomes misaligned with the electromagnetic head. Such misalignment often leads to errors as already described. To counter this tendency of the magnetic tape to wander across the electromagnetic head, one illustrative embodiment provides servo information on the magnetic tape. According to one alternative variation of the present method, the position of the magnetic tape relative to the electromagnetic head is sensed (step 35) and the position of the electromagnetic head is adjusted according to the sensed position of the magnetic tape (step 40). In one illustrative example, the electromagnetic head reads servo information from the magnetic tape. The electromagnetic head feeds the servo information to a tape position sensor. The tape position sensor converts the servo information into a position indication. The position indication is fed into a head positioning unit. The head positioning unit generates a correction signal according to the position indication. The correction signal is applied to a head position actuator. The head position actuator moves the electromagnetic head to maintain proper alignment with the magnetic tape.

Figure 2:
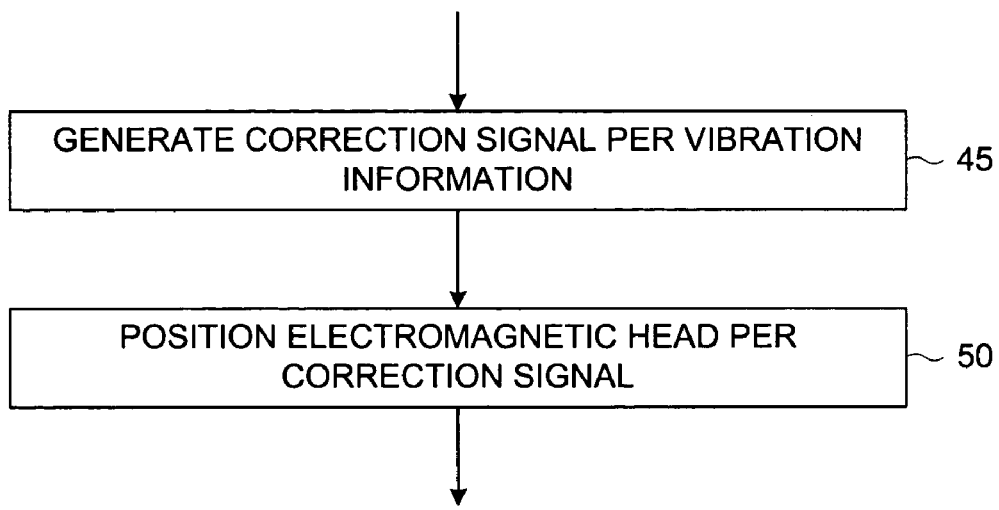
FIG. 2 is a flow diagram of a representative embodiment of a method for adjusting position.

FIG. 2 is a flow diagram of a representative embodiment of a method for adjusting position. The technique just described for positioning the electromagnetic head according to servo information applies as well to positioning the electromagnetic head according to sensed vibration. According to one variation of the present method, a correction signal is generated based upon vibration information (step 45). The position of the electromagnetic head is adjusted according to the correction signal (step 50). In one example already described, the correction signal is generated based upon vibration information received from an accelerometer. According to another example, the vibration correction signal is combined with the position correction signal to form an actuator drive signal. The actuator drive signal is applied to the head position actuator. The head position actuator moves the electromagnetic head according to the actuator drive signal to maintain proper alignment with the magnetic tape according to both vibration and position information.

The vibration or shock experienced by the tape transport mechanism that supports an electromagnetic head generally includes both low frequency components and high frequency components. The degree to which low frequency and high frequency components affect the resultant motion of the electromagnetic head depends in part upon a concept well known in the art and referred to as a frequency response. The frequency response of electromagnetic head positioning is influenced by the vibration sensor that senses the vibration experienced by the electromagnetic head. The frequency response further is influenced by the electronic circuits that process vibration information received from the vibration sensor. The frequency response still further is influenced by the mass of the actuator that actually moves the electromagnetic head according to the vibration information. The frequency response even still further is influenced by the mass of the electromagnetic head, itself. All of the aforementioned influences and countless others that can not be readily quantified determine the frequency response of positioning the electromagnetic head. As such, the positioning control applied to the electromagnetic head may not be capable of moving the electromagnetic head to respond properly to high frequency components of vibration or shock. One alternative variation of the present method further comprises limiting vibration frequencies imparted to the tape transport mechanism in accordance with the frequency response of positioning the electromagnetic head. According to one embodiment, this limiting results from vibration-absorbing mounting hardware that prevents high frequency vibration from reaching the tape transport mechanism. The vibration-absorbing mounting hardware, according to one embodiment, is disposed between the tape transport mechanism and an external mounting structure.

Figure 3:
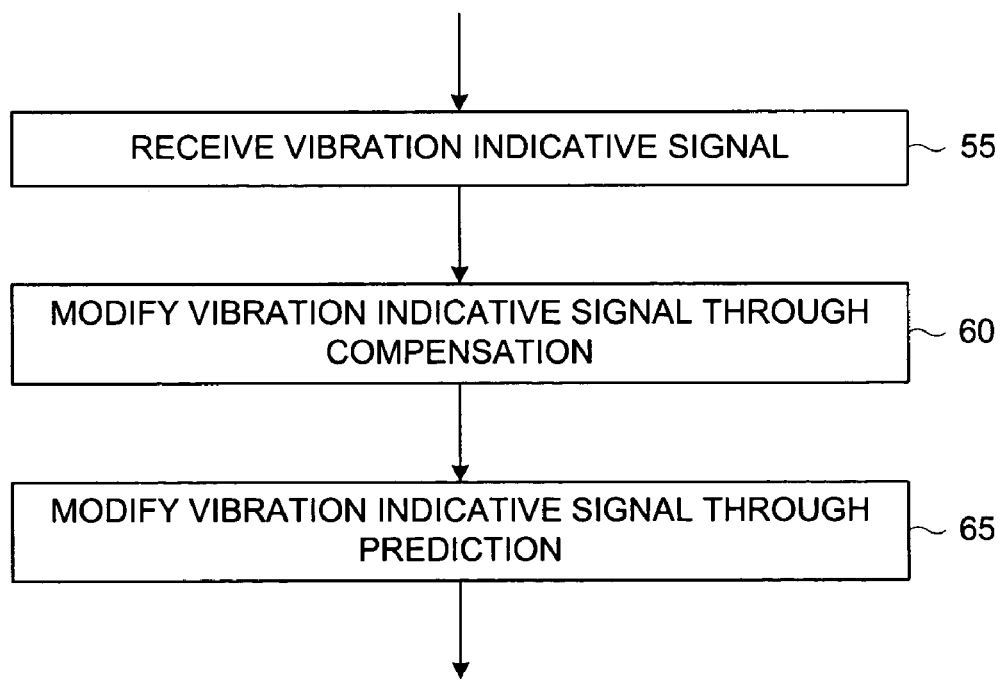
FIG. 3 is a flow diagram of a representative embodiment of a method for generating a correction signal.

FIG. 3 is a flow diagram of a representative embodiment of a method for generating a correction signal. According to one illustrative variation of the present method, a vibration indicative signal is received (step 55). This variation of the present method further comprises modifying the vibration indicative signal to improve the response of positioning the electromagnetic head. One illustrative variation of the present method modifies the vibration indicative signal through compensation (step 60). Another illustrative variation of the present method modifies the vibration indicative signal through prediction (step 65).

According to one example, a vibration indicative signal is received from an accelerometer as already described. One example method for applying compensation to the vibration indicative signal employs low-pass filtering. Low-pass filtering is an electronic method of removing undesirable high frequency components from the vibration indicative signal. Some undesirable high frequency components arise from extraneous sources such as radiation from nearby computers. These high frequencies contain no information that relates to mechanical vibration and are best removed from the vibration indicative signal by low-pass filtering.

Another illustrative example of compensation comprises electronic techniques to improve the response of positioning the electromagnetic head. Positioning the electromagnetic head is a closed-loop process. That is, according to one example, vibration is sensed, and, through the chain of connections outlined above, the electromagnetic head is moved according to the vibration. However, the movement of the electromagnetic head causes its own secondary vibration that also is sensed by the vibration sensor. A closed loop thus is formed in which sensed vibration causes additional sensed vibration. The additional vibration caused by the response to the original vibration is an example of "feedback." Without proper compensation, the head positioning process can lead to uncontrolled oscillation of the position of the electromagnetic head. Generally, such uncontrolled oscillation results when the feedback signal in a closed loop system is too large and is fed back with the wrong phase. This uncontrolled oscillation is like the high-pitched whine that results when a signal from a speaker is picked up by a microphone that passes the signal to an amplifier that passes the signal to the speaker, thus forming a closed loop. One compensation method acts to "slow down" the response of the loop by filtering out high frequencies, thus preventing uncontrolled oscillation. One alternative compensation method introduces frequency-dependent phase changes in the closed loop characteristics of the head positioning process in order to prevent uncontrolled oscillation. The compensation methods described here are introduced only as illustrations and are not to be construed as intent to limit the appended claims.

If too much compensation is applied, the electromagnetic head cannot be moved quickly enough to counteract the effects of vibration. A proper balance must be maintained between loop response time and a tendency to uncontrolled oscillation. One tool for fine tuning this balance is called prediction. One form of prediction acts to boost high frequencies, thus speeding up the response of a closed loop. The speed-up in closed loop response permits the electromagnetic head to move more quickly to compensate for vibration or to follow a tape position signal. According to one example embodiment, compensation and prediction are used together to optimize the performance of positioning the electromagnetic head. According to another examplary embodiment, prediction is used in the absence of compensation.

Figure 4:
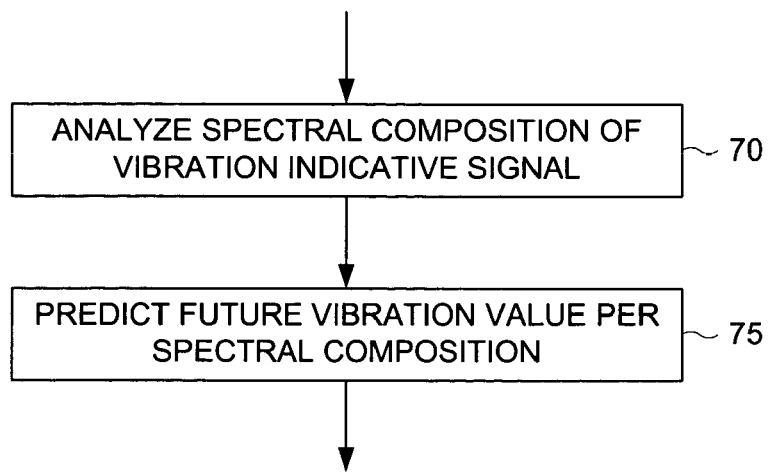
FIG. 4 is a flow diagram of a representative embodiment of a method for implementing prediction using spectral techniques.

FIG. 4 is a flow diagram of a representative embodiment of a method for implementing prediction using spectral techniques. According to one examplary variation of the method, prediction comprises performing a spectral analysis of the vibration indicative signal (step 70). One exemplary method of performing a spectral analysis comprises computing a discrete Fourier transform (DFT) of the vibration indicative signal. Several methods well known to those skilled in the art are available for computing a DFT. One illustrative method, referred to as a fast Fourier transform (FFT), performs an efficient calculation of a DFT over a full spectrum of frequencies. One alternative illustrative method, referred to as a Goertzel DFT, performs an efficient calculation of a DFT at a single frequency.

In some embodiments of tape drive hardware, electric motors that share the mechanical environment of the tape drive comprise one source of vibration. When these electric motors operate synchronously with power line voltage, vibration of the motors occurs at harmonics of a fundamental power line frequency. In such embodiments, the vibration signal received from a vibration sensor comprises repetitive components. Knowledge of the past behavior of such repetitive components permits accurate estimation of their future values. Typically, the characteristics of the repetitive components vary only slowly and so can be extracted by DFT techniques. According to one example, this extraction comprises computing the amplitude and phase of discrete frequency components present in the vibration indicative signal. Knowledge of this amplitude and phase information permits predicting the value of periodic components of the vibration indicative signal at a future time (step 75). With this knowledge of the future value of periodic components of the vibration indicative signal, adjustment of the position of the electromagnetic head to compensate for these periodic vibration components is performed with essentially zero delay.

Figure 5:
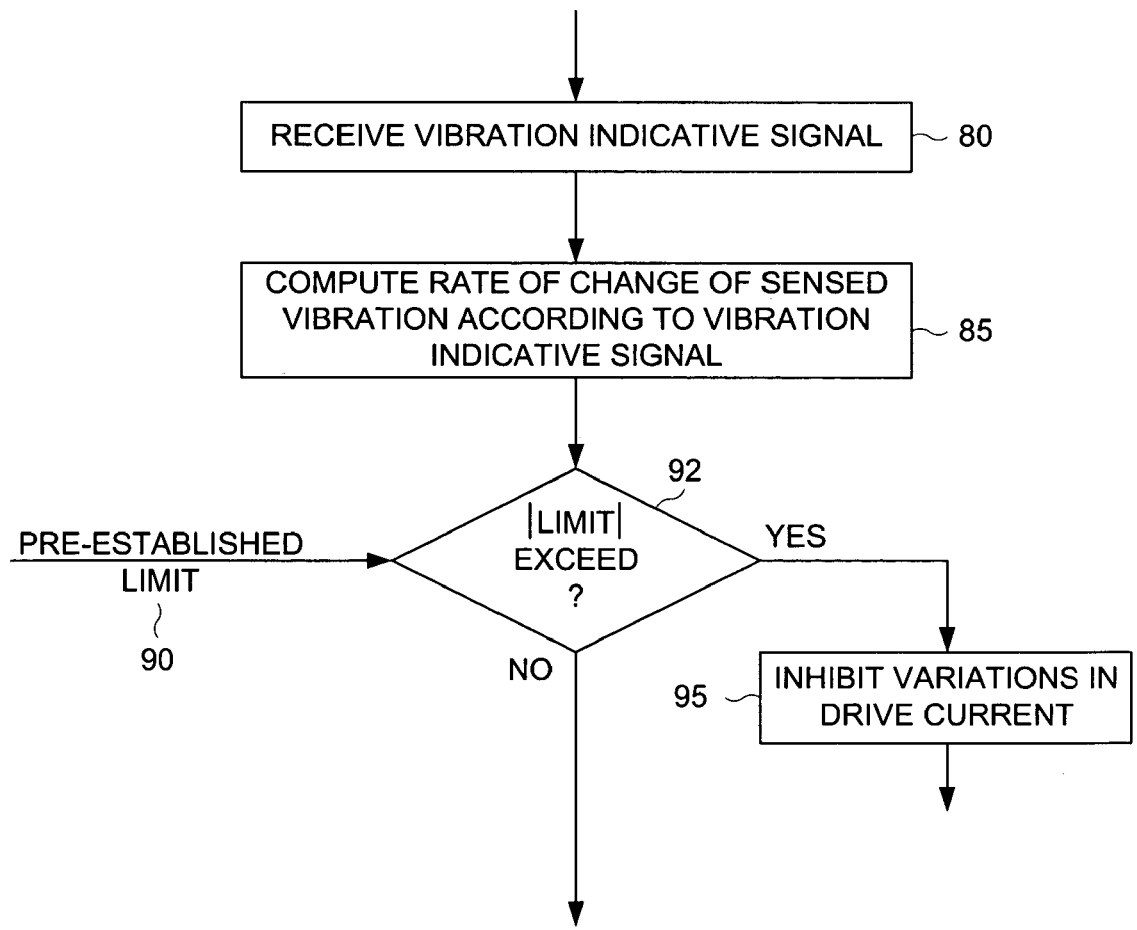
FIG. 5 is a flow diagram of a representative embodiment of a method for limiting the effect of extreme vibration.

FIG. 5 is a flow diagram of a representative embodiment of a method for limiting the effect of extreme vibration. Some mechanical vibrations are so extreme that they cannot be compensated for by electronic means. According to one exemplary use case, a worker moving a computer case may accidentally drop the unit while a tape drive is operating therein. Such an occurrence produces vibration outside the range of what can reasonably be expected in day-to-day operation of the tape drive. Even so, it is desirable to minimize the effects of such an anomalous event. According to one variation, the method described in FIG. 5 is applied when a tape drive operates in a write mode. According to one alternative variation of the present method, the vibration indicative signal is received (step 80). The rate of change of the sensed vibration is computed (step 85). The magnitude (i.e. the absolute value) of the rate of change of the sensed vibration is compared (step 92) with a pre-established limit 90. When the magnitude of the rate of change of the sensed vibration exceeds the pre-established limit 90, then variations in the drive current to the electromagnetic head are inhibited (step 95). In this way, writing on the tape is precluded when a high probability of write errors exists.

According to one illustrative use case, the vibration indicative signal received represents the acceleration of the tape transport mechanism that supports the electromagnetic head. In this illustrative use case, the rate of change of the sensed vibration comprises a derivative with respect to time of the vibration indicative signal. One apparatus that computes a derivative is described infra.

Figure 6:
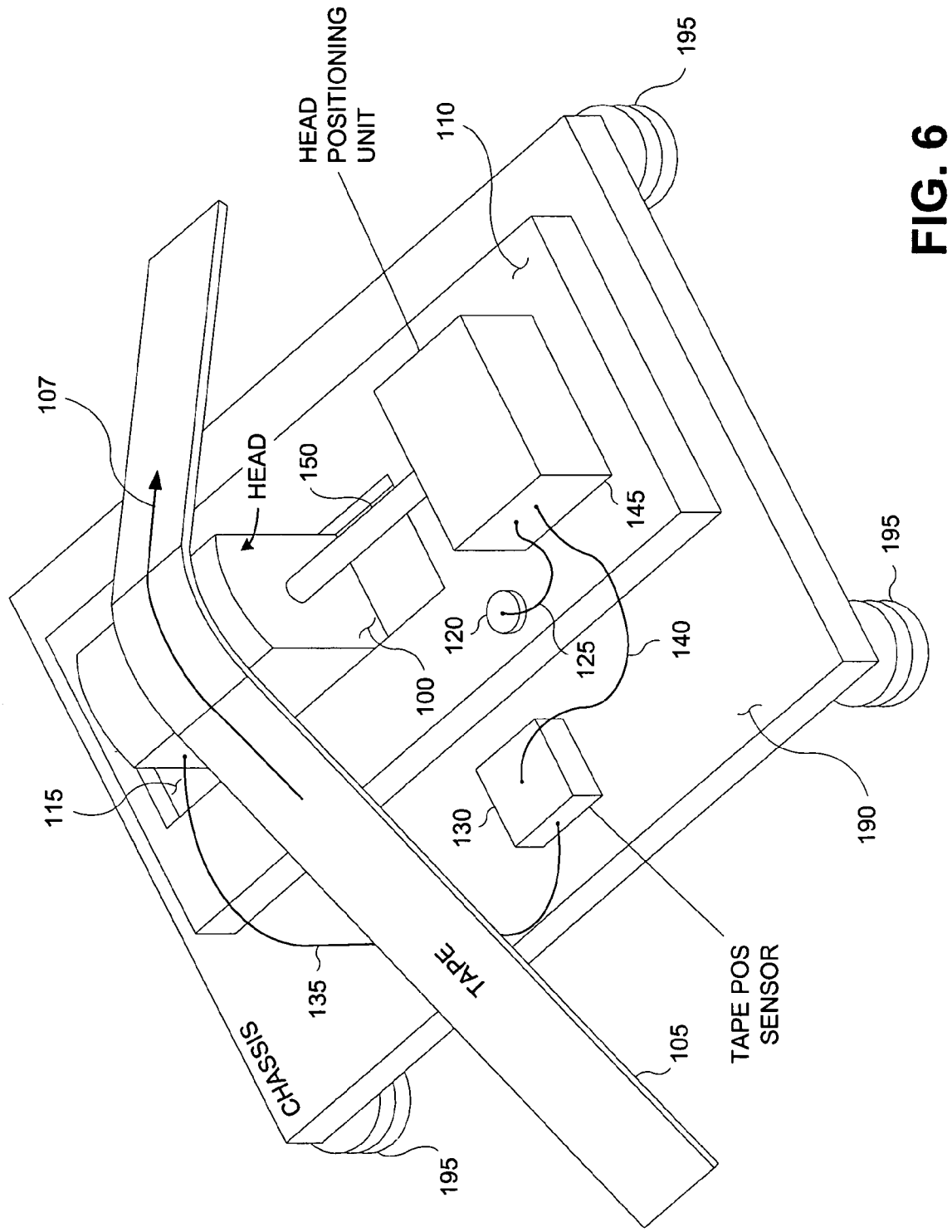
FIG. 6 is a pictorial diagram of a representative embodiment of an electromagnetic head assembly.

FIG. 6 is a pictorial diagram of a representative embodiment of an electromagnetic head assembly. According to the present embodiment, which is able to compensate for sensed vibration according to the present method, the electromagnetic head assembly comprises an electromagnetic head 100, a vibration sensor 120, and a head positioning unit 145. A carriage 110 supports the electromagnetic head 100. The electromagnetic head 100 is disposed to read or write a magnetic tape 105. In operation, the magnetic tape 105 passes over the electromagnetic head 100 in a direction of motion 107. Tape guides (not shown) disposed on opposite sides of the electromagnetic head 100 act to position the tape over the electromagnetic head 100. One illustrative example of the carriage 110 comprises a slot 115 that supports and guides the motion of the electromagnetic head 100. The electromagnetic head 100 is allowed to move in the slot 115 in a direction transverse to the direction of motion 107 of the magnetic tape 105. This direction of the motion of the electromagnetic head 100 defines a control axis.

According to the present embodiment, the vibration sensor 120 is capable of sensing vibration imparted to the chassis 190 which is rigidly attached to the carriage 110. The vibration sensor 120, therefore, is capable of sensing vibration imparted to the electromagnetic head assembly. According to one alternative embodiment, the vibration sensor 120 is attached to the chassis 190 portion of the electromagnetic head assembly. The vibration sensor 120 is capable of generating a vibration indicative signal 125 according to sensed vibration in the direction of the control axis. According to one illustrative embodiment, the vibration sensor 120 comprises an accelerometer. According to another illustrative embodiment, the vibration signal 125 is an electrical signal generated by the accelerometer.

According to the present embodiment, the head positioning unit 145 is capable of adjusting the position of the electromagnetic head 100 according to the sensed vibration. According to one illustrative embodiment, the sensed vibration is represented by the vibration indicative signal 125. The head positioning unit 145 processes the vibration indicative signal 125 to generate a control signal. The control signal drives a head position actuator that is included in the head positioning unit 145 according to one example embodiment. The head position actuator is mechanically connected to the electromagnetic head 100. According to one illustrative example, the mechanical connection comprises a threaded shaft 150. The threads in the shaft 150 mate with threads in the electromagnetic head 100. The head positioning unit 145 is able to rotate the shaft 150. The rotation of the shaft 150 causes the electromagnetic head 100 to move in the direction of the control axis.

According to another alternative embodiment, the electromagnetic head assembly still further comprises a tape position sensor 130. The tape position sensor 130 is capable of generating a tape position signal 140 according to the position of the magnetic tape 105. In one illustrative embodiment, servo information is provided on the magnetic tape 105. The servo information is read by the electromagnetic head 100. The electromagnetic head 100 generates a servo signal 135 according to the servo information read from the magnetic tape 105. The servo signal 135 is passed to the tape position sensor 130. The tape position sensor 130 generates the tape position signal 140 according to the servo signal 135. The tape position signal 140 is indicative of the position of the magnetic tape 105 relative to the electromagnetic head 100. The head positioning unit 145, according to this alternative embodiment, is able to receive the tape position signal 140. The head positioning unit 145 further is able to adjust the position of the electromagnetic head 100 according to the tape position signal 140 in the manner already described.

Figure 7:
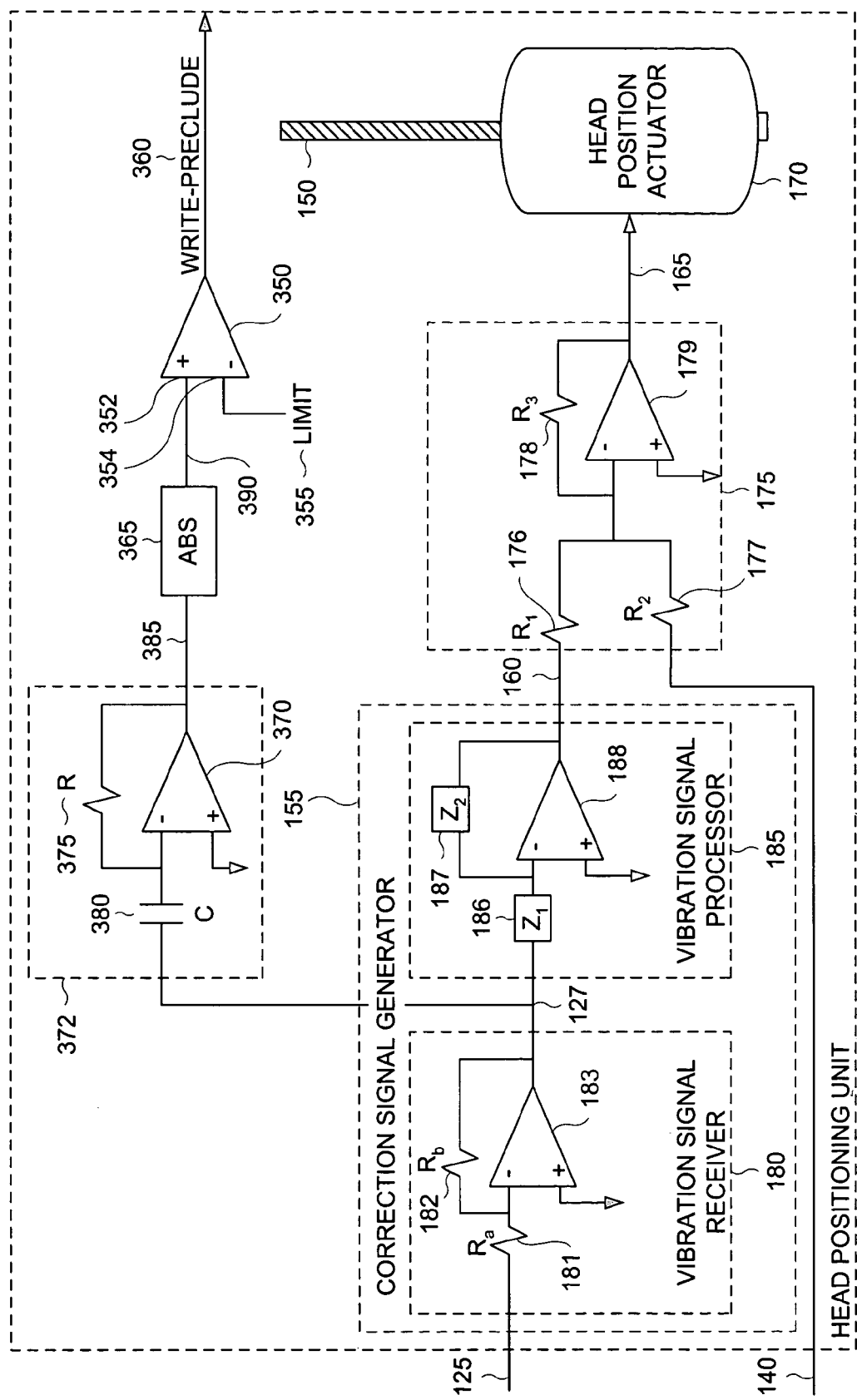
FIG. 7 is a block diagram of a representative embodiment of a head positioning unit.

FIG. 7 is a block diagram of a representative embodiment of a head positioning unit 145. This alternative representative embodiment of the head positioning unit 145 comprises a correction signal generator 155 and a head position actuator 170. The correction signal generator 155 is capable of receiving vibration information from the vibration sensor 120. The correction signal generator 155 further is capable of generating a correction signal 160 according to the vibration information. The head position actuator 170, according to this alternative embodiment, positions the electromagnetic head 100 according to the correction signal 160. According to one example embodiment of the head positioning unit 145, vibration information is carried by the vibration indicative signal 125. It should be noted that the figure depicts an optional actuator driver 175, which is described below. Accordingly, the correction signal 160 is used to directly drive the actuator 170 in embodiments where the actuator driver 175 is not included.

In some cases, the head position actuator 170 requires more power than the correction signal generator 155 can provide. Accordingly, one example embodiment of the head positioning unit 145 further comprises an actuator driver 175 that is capable of receiving the correction signal 160. The actuator driver 175 uses the correction signal 160 to generate an actuator drive signal 165 that supports the power requirements of the head position actuator 170. The head position actuator 170 is then driven by the actuator drive signal 165. The head position actuator 170 further is capable of positioning the electromagnetic head 100 according to the actuator drive signal 165. It should be understood that the actuator drive signal 165 is responsive to the correction signal 160. The head position actuator 170, being responsive to the actuator drive signal 165 is, therefore, responsive to the correction signal 160. The head position actuator 170 therefore is capable of positioning the electromagnetic head 100 according to the correction signal 160. According to one example embodiment, the head position actuator 170 positions the electromagnetic head 100 by rotating the shaft 150 as described supra. The actuator itself, according to one alternative embodiment, comprises a stepper motor, a servo motor, a voice coil or a combination of any of these.

One alternative embodiment of the correction signal generator 155 comprises a vibration signal receiver 180 and a vibration signal processor 185. The vibration signal receiver 180 is capable of receiving a vibration indicative signal 125, e.g. from the vibration sensor 120. One example embodiment of the vibration signal receiver 180 comprises an amplifier that is capable of receiving the vibration indicative signal 125. The amplifier further is capable of increasing the amplitude of the vibration indicative signal 125 to produce an amplified signal 127. One illustrative embodiment of an amplifier comprises an operational amplifier 183 with coupling resistor $R_a$ 181 and feedback resistor $R_b$ 182. The amplifier in this example embodiment increases the amplitude of the vibration indicative signal 125 by a factor of $-R_b/R_a$ to produce the amplified signal 127.

The vibration signal processor 185 is capable of modifying the amplified signal 127 by applying at least one of compensation and prediction in order to improve the response of the head position actuator 170. One example embodiment of the vibration signal processor 185 comprises an operational amplifier 188 with coupling impedance $Z_1$ 186 and feedback impedance $Z_2$ 187. This example embodiment of the vibration signal processor 185 receives the amplified signal 127. Impedances $Z_1$ 186 and $Z_2$ 187, according to another example embodiment of the vibration signal processor 185, comprise combinations of resistors and capacitors. The operations of compensation and prediction are implemented by choosing the proper combinations of resistors and capacitors. For example, choosing $Z_2$ 187 to be a resistor in parallel with a capacitor and choosing $Z_1$ 186 to be a resistor provides one form of compensation. In another example, choosing $Z_1$ 186 to be a resistor in parallel with a capacitor and choosing $Z_2$ 187 to be a resistor provides one form of prediction. According to yet another example, both compensation and prediction can be applied simultaneously according to the design requirements of the head positioning unit 145. Typically, compensation and prediction are employed to balance the response of the head positioning unit 145 to vibration or shock against the need for stability in the control loop according to the method described herein. The examples just cited are included for illustrative purposes only and are not intended to limit the scope of the appended claims.

Figure 7A:
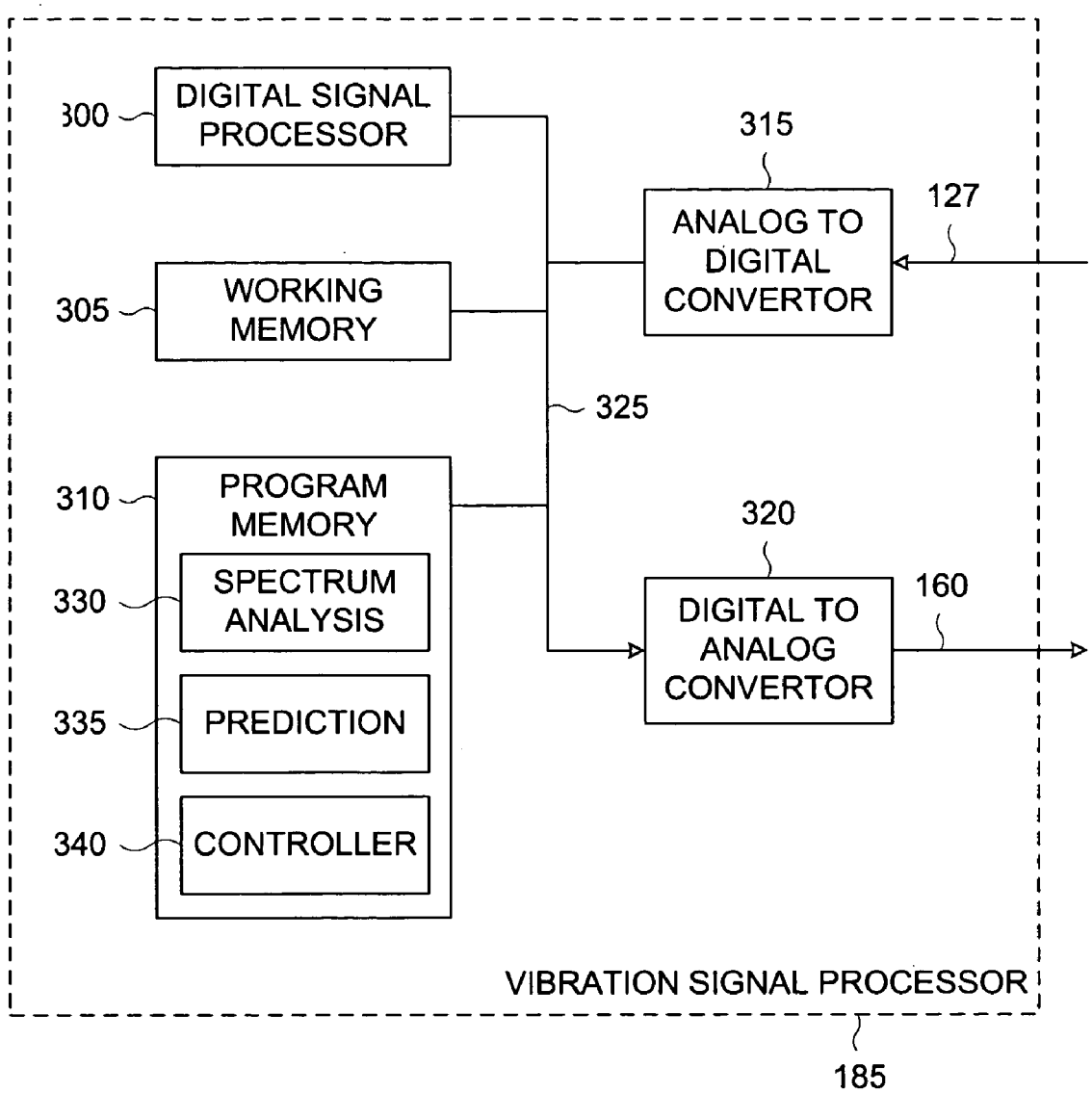
FIG. 7A is a block diagram of one alternative embodiment of a vibration signal processor.

FIG. 7A is a block diagram of one alternative embodiment of a vibration signal processor. Whereas the vibration signal processor 185 illustrated in FIG. 7 employs analog techniques to operate on the amplified signal 127, the alternative embodiment presented in FIG. 7A employs a digital method. This alternative embodiment comprises a processor 300, which according to one alternative embodiment comprises a digital signal processor (DSP), capable of executing instructions. This example embodiment further comprises working memory 305 and program memory 310. Instruction sequences comprising a spectrum analysis instruction sequence 330 and a prediction instruction sequence 335 are stored in the program memory 310. A controller instruction sequence 340 is also included in this embodiment and stored in the program memory 310. This alternative embodiment further comprises an analog-to-digital converter 315 and a digital-to-analog converter 320. A system bus 325 interconnects the aforementioned elements.

The operation of the vibration signal processor 185 depicted in FIG. 7A is best described in terms of functional modules. Each of the instruction sequences stored in the program memory 310, when loaded and executed by the processor 300, minimally causes the processor 300 to perform the functions of a module according to the instruction sequence. Hence, the terms "functional module" and "instruction sequence" can be used in a substantially interchangeable manner. It should also be noted that the term "minimally causes the processor" and variants thereof are intended to serve as an open-ended enumerations of the functions performed by the processor as it executes a functional module (i.e. an instruction sequence). Accordingly, embodiments of a functional module that cause the processor to perform functions in addition to those enumerated are intended to be included in the scope of the claims appended hereto.

Figure 7B:
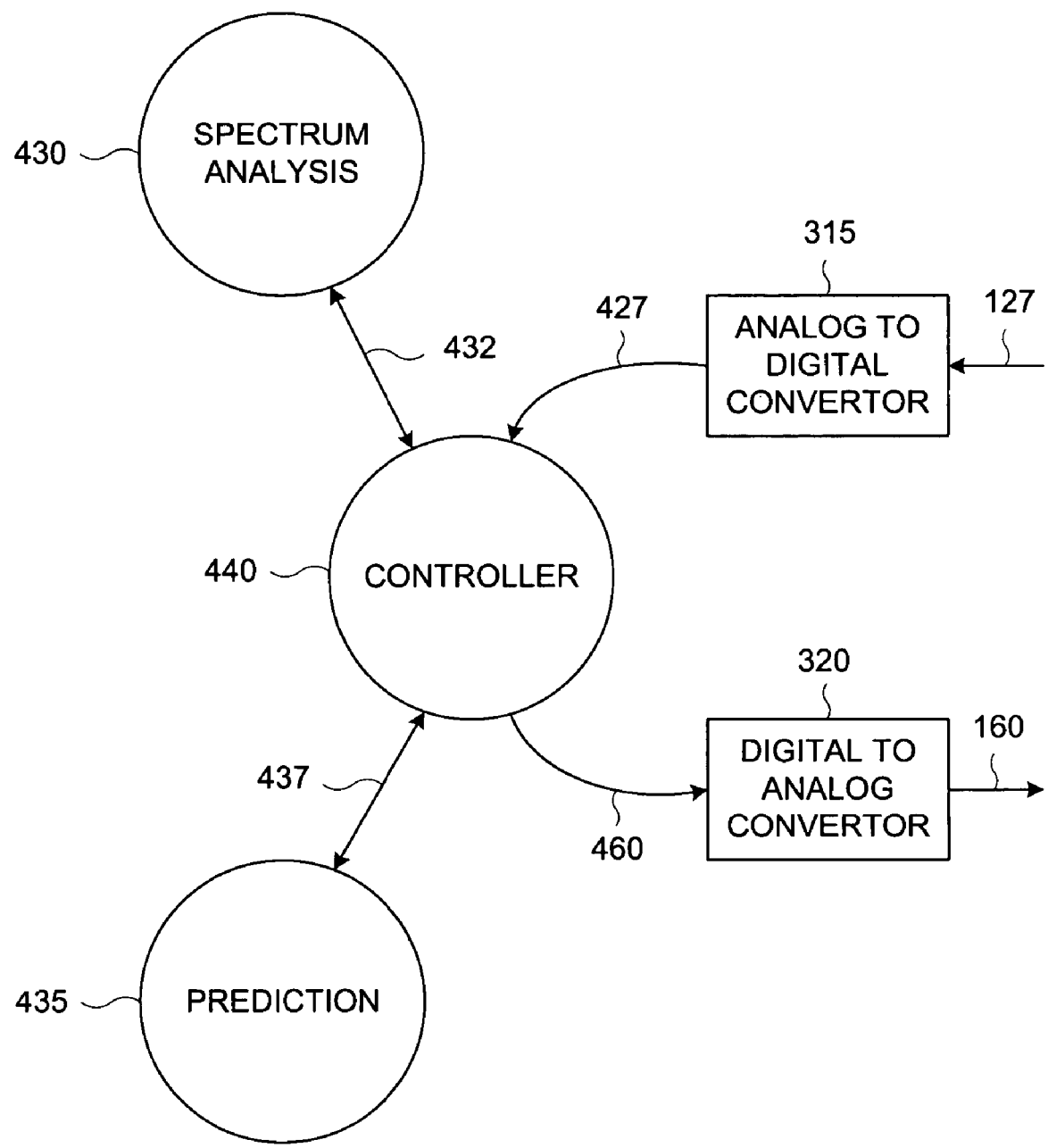
FIG. 7B is a data flow diagram that describes interaction of functional modules in one example embodiment of a vibration signal processor.

FIG. 7B is a data flow diagram that describes interaction of functional modules in one example embodiment of a vibration signal processor. The controller module 340 coordinates the operation of the spectrum analysis module 330 and the prediction module 335. According to one exemplary mode of operation, the analog-to-digital converter 315 receives the amplified signal 127 and creates a digital representation 427 of the amplified signal 127. It should be recalled that the amplified signal 127, according to one exemplary embodiment, is an amplified version of the vibration indicative signal 125. Any element responsive to the amplified signal 127 therefore is responsive to the vibration indicative signal 125. In particular, the digital representation 427 is one form of a digital representation of the vibration indicative signal 125. One example of a digital representation 427 comprises a sequence of values of the amplified signal 127 (these values are referred to as "samples") taken at equally-spaced time instants and expressed in numerical (i.e. digital) form. According to the same exemplary mode of operation, a sequence of N samples of the digital representation 427 is received by the controller 340 and stored in working memory 305. N, according to the present example, is a positive integer chosen to be large enough that several repetitions of the most rapidly repeating component of the input signal 127 are included in the collection. Typical values for N are 512, 1024, and 2048, but this choice of values is not intended to limit the scope of the appended claims.

With the samples of the digital representation 427 stored in the working memory 305, the controller module 340 communicates with the spectrum analysis module 330 through a first control path 432. The controller module 340 thus causes the spectrum analysis module 330 to compute a discrete Fourier transform (DFT) of the sequence of N samples of the digital representation 427 located in the working memory 305. The resulting DFT comprises a new sequence of N samples, each of which represents the amplitude and phase of elementary frequency components that, when summed together, recreate the original digital representation 427. The controller 340 then communicates with the prediction module 335 through a second control path 437. The controller module 340 thus causes the prediction module 335 to compute a future value of the digital representation 427 according to the computed DFT.

According to one illustrative embodiment, the controller 340 initiates action of the prediction module 335. The prediction module 335 examines the magnitude of the DFT and creates a modified DFT comprising only a few (e.g. about 10–20) of the largest samples in the DFT sequence. The remaining samples in the DFT sequence are set to zero. The modified DFT sequence is placed in working memory 305. The controller 340 then causes the spectrum analysis module 330 to compute an inverse discrete Fourier transform (IDFT) of the modified DFT in working memory 305. This computation produces a new sequence of N samples in working memory 305 that comprises the dominant repetitive vibration components in the amplified signal 127. Because of the repetitive nature of these dominant components, their values can be predicted at equally-spaced time instants extending into the future for a number of samples approximately equal to $\alpha$N where $\alpha$ is a small number typically less than 10. The controller 340 then causes the prediction module 335 to compute a sequence of future values of the amplified signal 127 according to the new sequence of N samples in working memory 305. The sequence of future values calculated by the prediction module 335 is placed in working memory 305. The controller 340 retrieves the sequence of future values from working memory 305 and passes the result as a sequence of values 460 to the digital-to-analog converter 320. The digital-to-analog converter 320 converts the digital sample sequence 460 to analog form and presents the resulting analog signal as the correction signal 160. With knowledge of future values of the correction signal 160, the head positioning unit 145 is capable of positioning the electromagnetic head 100 according to the vibration indicative signal 125 with essentially zero delay.

FIG. 7 further illustrates that, according to one example embodiment of the head positioning unit 145, the correction signal 160 and the tape position signal 140 are received by an actuator driver 175. The actuator driver 175, according to one example embodiment, comprises an operational amplifier 179, coupling resistors $R_1$ 176 and $R_2$ 177, and a feedback resistor $R_3$ 178. The correction signal 160 is coupled to the actuator driver 175 through coupling resistor $R_1$ 176. The tape position signal 140 is coupled to the actuator driver 175 through coupling resistor $R_2$ 177. The actuator driver 175, according to this example embodiment, is able to combine the correction signal 160 with the tape position signal 140. The combination of the correction signal 160 and the tape position signal 140 produces an actuator drive signal 165. The actuator drive signal 165 comprises the correction signal 160 and the tape position signal 140 with the respective strength of each signal being adjusted according to the values chosen for $R_1$ 176, $R_2$ 177, and $R_3$ 178. For example, the actuator drive signal 165 comprises the correction signal 160 applied with weighting factor $w_1 = -R_3/R_1$. The actuator drive signal 165 further comprises the tape position signal 140 applied with weighting factor $w_2 = -R_3/R_2$. This example illustrates how the head position actuator 170 can be responsive to both the correction signal 160 and the tape position signal 140 according to the choice of weighting factors $w_1$ and $w_2$.

FIG. 6 also illustrates yet another alternative illustrative embodiment of the electromagnetic head assembly further comprises a vibration limiter. The vibration limiter is capable of limiting vibration frequencies of the chassis 190 in accordance with the frequency response of the head position actuator 170. According to one example, a vibration limiter comprises a frequency-limiting mounting bracket 195. The frequency-limiting mounting bracket 195 secures the chassis 190 to a body of the tape drive (not shown). The body is subject to externally applied shock and vibration. The vibration frequency-limiting mounting bracket 195 is capable of limiting vibration frequencies that couple to the chassis 190 from the body along the control axis.

One method of characterizing the head positioning unit 145, according to the present illustrative embodiment, is to define a mathematical "frequency response." The frequency response relates the position of the electromagnetic head 100 to the vibration indicative signal 125. A vibration indicative signal 125 includes a large number of frequency components. Each of these frequency components is affected by the combination of the vibration sensor 120, the correction signal generator 155, the head positioning actuator 170, the electromagnetic head 100, and the chassis 190 either singularly or collectively in a slightly different way. The frequency response is a mathematical summary of how each frequency component is affected. The frequency response, so defined, often is called the frequency response of the head position actuator 170. In broad terms, mechanical devices such as the electromagnetic head 100 and the head position actuator 170 respond more readily to low frequencies than to high frequencies. According to the present illustrative embodiment of the electromagnetic head assembly, the vibration frequency-limiting mounting bracket 195 acts to damp out high vibration frequencies. Generally, the vibration frequency-limiting mounting bracket 195 acts to pass lower frequency components of vibration that can be compensated for according to the present method.

FIG. 7 also illustrates another alternative embodiment of the head positioning unit. This alternative embodiment further comprises a comparator 350 responsive to the magnitude of the rate of change (i.e. the derivative with respect to time) of the vibration indicative signal 125. The comparator 350 comprises a first input terminal 352 and a second input terminal 354. A constant signal set to a pre-established limit (LIMIT 355) is applied to the second input terminal 354 of the comparator 350. The comparator 350 asserts a control signal (WRITE_PRECLUDE 360) whenever the level of the signal applied to the first input terminal 352 exceeds the level of the pre-established limit 355. This alternative embodiment further comprises a differentiator 372 comprising an operational amplifier 370 with feedback resistor 375 and a coupling capacitor 380.

The operational amplifier 370 configured with a feedback resistor 375 and a coupling capacitor 380 is capable of computing a derivative. According to one illustrative embodiment, a derivative of the amplified signal 127 is computed by choosing the capacitor 380 to have value C and the resistor 375 to have value R. Temporarily representing the amplified signal 127 by the notation x(t), this choice of component values produces an output 385 of the differentiator 372 of $$RC\frac{d(x(t))}{dt}$$

at time t, representing the derivative with respect to time of the amplified signal 127.

The output 385 of the differentiator 372 is proportional to the derivative of the amplified signal 127. According to one exemplary embodiment already discussed, the amplified signal 127 is proportional to the vibration indicative signal 125. The output 385 of the differentiator 372 therefore is proportional to the derivative of the vibration indicative signal 125.

The present alternative embodiment further comprises an absolute value unit 365 that passes positive inputs to its output unchanged and passes negative inputs to its output multiplied by minus one. The input of the absolute value unit 365 is the output 385 of the differentiator 372. The output 390 of the absolute value unit 365 is applied to the first input terminal 352 of the comparator 350. The comparator input 352 therefore is proportional to the absolute value of the derivative (i.e. the rate of change) of the vibration indicative signal 125. According to one illustrative embodiment, the value of the pre-established limit 355 is adjusted according to a constant of proportionality that relates the vibration indicative signal 125 to the output 385 of the differentiator 372. The WRITE_PRECLUDE signal 360 is asserted whenever the signal 390 exceeds the pre-established limit 355.

According to one illustrative embodiment of the head positioning unit 145, the amplified signal 127 connects directly to the input of the absolute value unit 365, effectively bypassing the differentiator 372. This illustrative embodiment compares the magnitude of the amplified signal 127 with pre-established limit 355 and asserts the WRITE_PRECLUDE signal 360 whenever the magnitude of the amplified signal 127 exceeds the pre-established limit 355.

Figure 8:
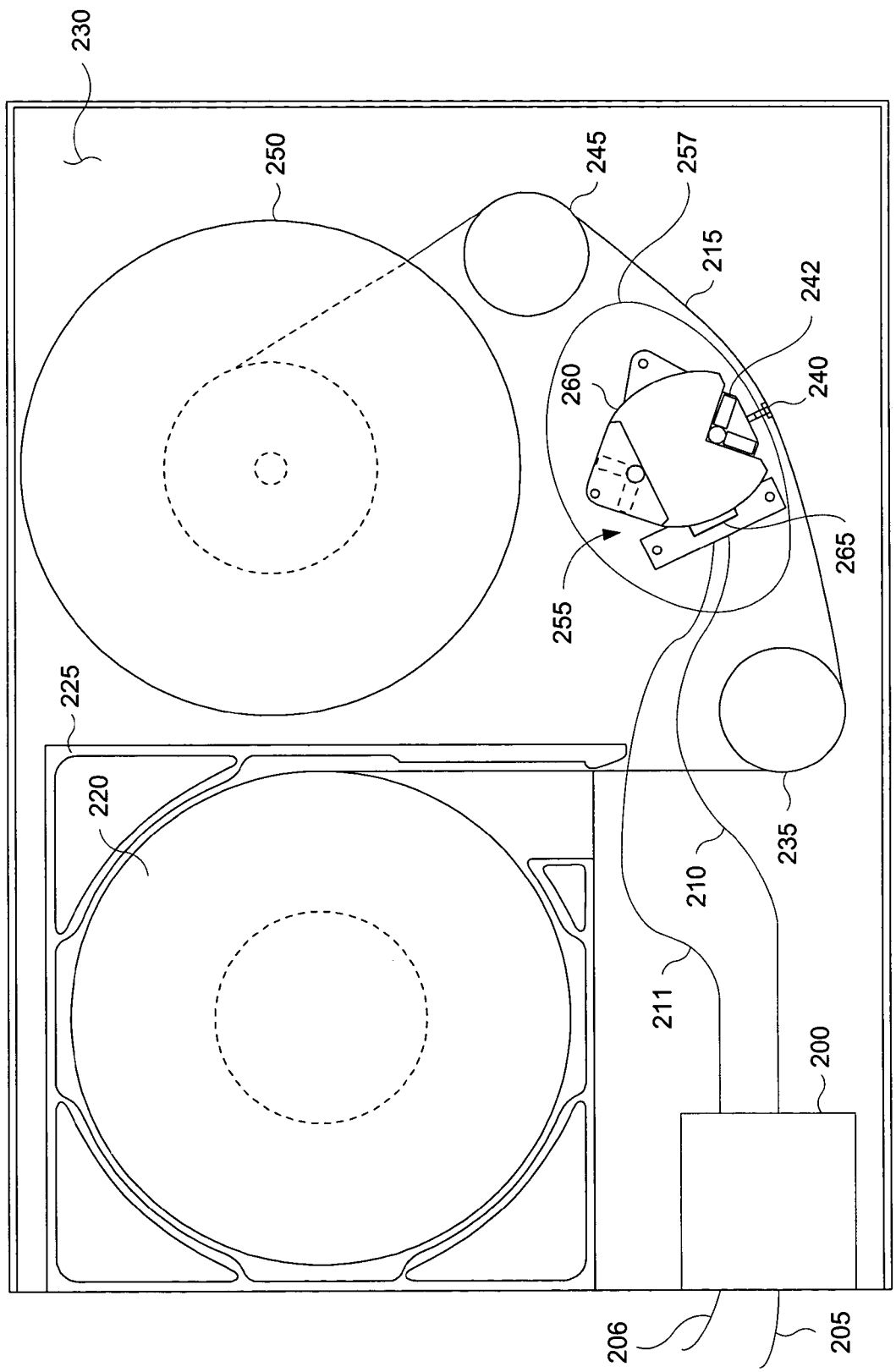
FIG. 8 is a pictorial diagram of a representative embodiment of a magnetic tape drive.

FIG. 8 is a pictorial diagram of a representative embodiment of a magnetic tape drive. According to one example embodiment, a magnetic tape drive comprises a tape transport mechanism 230, an electromagnetic head 240, an interface module 200, an accelerometer 265 and a head position control system 257. This example embodiment is capable of receiving a tape cartridge 225 that includes a magnetic tape 215. The tape cartridge 225 is inserted into the transport mechanism 230 of the tape drive. In operation, the tape transport mechanism 230 passes the magnetic tape 215 from a supply spool 220, around a first tape guide 235, over the electromagnetic head 240, and around a second tape guide 245 to a take up spool 250.

According to the present example embodiment, the interface module 200 is capable of receiving data 205. The interface module 200 further is capable of generating a head drive signal 210 according to the received data 205. The electromagnetic head 240 is able to receive the head drive signal 210. The electromagnetic head 240 further is able to impart data onto the tape by generating a magnetic field according to the head drive signal 210 when the tape drive operates in a write mode. When the tape drive operates in a read mode, the electromagnetic head 240 is capable of generating a head read signal 211 according to data stored on the tape. The electromagnetic head 240 further is capable of passing the head read signal 211 to the interface module 200. The interface module 200 is able to convert the information in the head read signal 211 to a form 206 that can be received by an external receiver.

According to one alternative embodiment, the interface module 200 further comprises a Small Computer Systems Interface (SCSI) that is managed by a central processing unit included in the interface module 200. According to yet another alternative embodiment, the interface module further comprises an Integrated Device Electronics (IDE) interface. The IDE interface is also managed by a central processing unit included in the interface module 200. Depending on which embodiment is utilized, the tape drive is capable of receiving data from a host computer by means of either the SCSI interface or the IDE interface. The SCSI and IDE alternative embodiments are described for illustration only. Other types of interface modules, e.g., a fiber channel interface can be used. The examples presented here are not to be construed as an intent to limit the scope of the appended claims. The interface module 200 then uses the data received from the host computer to vary the drive to the electromagnetic head 240.

A carriage 260, according to the present example embodiment, supports the electromagnetic head 240. The carriage 260 comprises a head position actuator 242. The electromagnetic head 240 is secured to the head position actuator 242. According to one alternative embodiment, the carriage 260 is part of an actuator assembly 255. The head position actuator 242 is capable of positioning the electromagnetic head 240 in the direction of a control axis over a desired track or tracks on the magnetic tape 215.

The accelerometer 265 in the present example embodiment is capable of sensing vibration imparted to the tape transport mechanism 230 in a direction parallel to the axis of motion of the electromagnetic head 240 (i.e. a control axis). The head position control system 257 is capable of adjusting the position of the electromagnetic head 240 according to the vibration sensed by the accelerometer 265.

According to one alternative embodiment of the magnetic tape drive, the accelerometer 265 is attached to the actuator assembly 255 and is capable of generating a vibration indicative signal according to sensed vibration. The accelerometer 265 further is responsive to vibration imparted to the tape transport mechanism 230 along the control axis. The accelerometer 265 still further generates a vibration indicative signal according to the vibration sensed by the accelerometer 265.

One alternative embodiment of the head position control system 257 comprises a correction signal generator 155 that, as disclosed in the discussion of the head positioning unit 145 in FIG. 7 supra, receives a vibration indicative signal from the accelerometer 265 and generates a correction signal 160. This alternative embodiment of the head position control system 257 further comprises a head position actuator 242 capable of positioning the electromagnetic head 240 according to the correction signal 160.

Another alternative embodiment of the magnetic tape drive further comprises a tape position sensor capable of receiving information about the tape position. According to one example embodiment of the magnetic tape drive, servo information is included on the magnetic tape 215. This servo information is read by the electromagnetic head 240. The electromagnetic head 240 generates a servo signal according to the servo information. The tape position sensor is capable of receiving the servo information. The tape position sensor further is capable of generating a tape position signal 140 indicative of the position of the tape as disclosed in the discussion of FIG. 7 supra. The head position control system 257 in this example embodiment further is capable of adjusting the position of the electromagnetic head 240. According to one example embodiment, an actuator drive signal 165 is generated according to the tape position signal 140. The head position actuator 242 responds to the actuator drive signal 165 by adjusting the position of the electromagnetic head 240 according to said actuator drive signal 165.

Considering once again the correction signal generator 155, according to another alternative embodiment the correction signal generator 155 further comprises a vibration signal receiver 180. The vibration signal receiver 180 is capable of receiving a vibration indicative signal, e.g. from the accelerometer 265, as disclosed in the discussion of FIG.

7 supra. This alternative embodiment of the correction signal generator 155 further comprises a vibration signal processor 185 capable of modifying the vibration indicative signal. The vibration signal processor 185 is capable of applying at least one of compensation and prediction in order to improve the response of the head position actuator 242 as disclosed in the discussion of FIG. 7 supra.

According to yet another alternative embodiment, the correction signal generator 155 included in the head position control system 257 further comprises a digital vibration signal processor 185. The digital vibration signal processor 185 comprises an analog-to-digital converter, memory, a digital signal processor (DSP), digital signal processing instruction sequences, and a digital-to-analog converter as described in the discussion of FIGS. 7A and 7B supra. The analog-to-digital converter converts the vibration indicative signal to digital form. The digital signal processing instruction sequences are stored in the memory and comprise a spectrum analysis instruction sequence that, when executed by the DSP, minimally causes the DSP to compute a transform of the digital version of the vibration indicative signal. The digital signal processing instruction sequences further comprise a prediction instruction sequence that, when executed by the processor, minimally causes the DSP 300 to compute a future value of the digital form of the vibration indicative signal according to the transform. This alternative embodiment still further comprises a digital-to-analog converter that presents the future value of the vibration indicative signal in analog form. This future value is used by the head position control system 257 to position the electromagnetic head as described in the discussion of FIG. 7 supra.

According to still one more alternative embodiment, the head position control system 257 still further comprises a comparator that generates a signal that precludes variations in the drive current to the electromagnetic head when the sensed vibration or its derivative exceeds a pre-established value. One illustrative embodiment of the comparator is described in the discussion of FIG. 7 supra.

Figure 9:
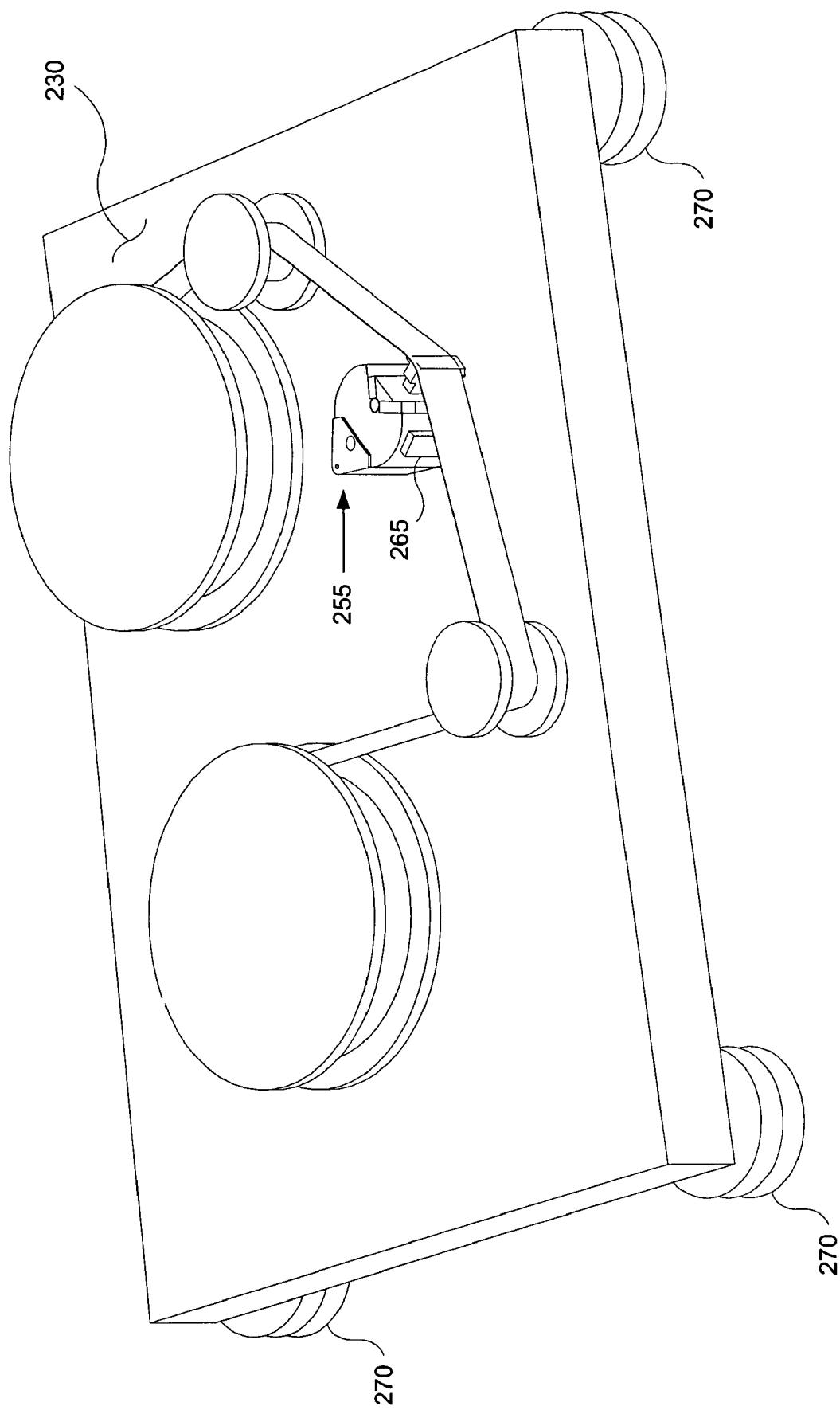
FIG. 9 is a perspective pictorial diagram of a representative embodiment of a tape transport mechanism.

FIG. 9 is a perspective pictorial diagram of a representative embodiment of a tape transport mechanism 230. According to one alternative embodiment, an isolation mount 270 is used to secure the tape transport mechanism 230 to the body (not shown) of the tape drive. The isolation mount 270 according to this embodiment of the actuator assembly 255 is capable of limiting vibration frequencies of the tape transport mechanism 230 in accordance with the frequency response of the head position control system. The frequency response concept is more fully described in the discussion of FIG. 7 supra.

While the present method, electromagnetic head assembly, magnetic tape drive, and tape head position system have been described in terms of several alternative methods and exemplary embodiments, it is contemplated that alternatives, modifications, permutations, and equivalents thereof will become apparent to those skilled in the art upon a reading of the specification and study of the drawings. It is therefore intended that the true spirit and scope of the appended claims include all such alternatives, modifications, permutations, and equivalents.

What is claimed is:

1. A method for storing data on and retrieving data from a magnetic tape comprising:
    receiving data when operating in a write mode;
    passing magnetic tape across an electromagnetic head;
    varying drive current to the electromagnetic head according to the data when operating in a write mode;
    sensing current induced in the electromagnetic head when operating in a read mode;
    sensing vibration imparted to a tape transport mechanism; and
    adjusting position of the electromagnetic head according to the sensed vibration to maintain proper alignment with the magnetic tape so the magnetic tape continues to pass across the electromagnetic head.

2. The method of claim 1 wherein sensing the vibration comprises generating an electrical signal according to the vibration experienced by a tape transport mechanism.

3. The method of claim 1 wherein adjusting the position comprises:
    generating a correction signal based on vibration information; and
    positioning the electromagnetic head according to the correction signal.

4. The method of claim 3 further comprising limiting vibration frequencies imparted to the tape transport mechanism in accordance with a frequency response of positioning the electromagnetic head.

5. The method of claim 3 wherein generating a correction signal comprises:
    receiving a vibration indicative signal; and
    modifying the vibration indicative signal through compensation in order to improve a response of positioning the electromagnetic head.

6. The method of claim 3 wherein generating a correction signal comprises:
    receiving a vibration indicative signal; and
    modifying the vibration indicative signal through prediction in order to improve a response of positioning the electromagnetic head.

7. The method of claim 6 wherein modifying the vibration indicative signal through prediction comprises:
    analyzing a spectral composition of the vibration indicative signal; and
    predicting a future vibration value according to the spectral composition.

8. The method of claim 1 further comprising:
    sensing a position of the magnetic tape relative to the electromagnetic head; and
    adjusting the position of the electromagnetic head according to the sensed position of the magnetic tape.

9. The method of claim 1 further comprising precluding variations in the drive current to the electromagnetic head when the sensed vibration exceeds a pre-established rate of change.

10. An electromagnetic head assembly comprising:
    electromagnetic head;
    vibration sensor capable of sensing vibration imparted to the electromagnetic head assembly; and
    head positioning unit capable of adjusting a position of the electromagnetic head according to the sensed vibration to maintain proper alignment with a magnetic tape so the magnetic tape continues to pass across the electromagnetic head.

11. The electromagnetic head assembly of claim 10 wherein the vibration sensor is attached to the electromagnetic head assembly and is capable of generating a vibration indicative signal.

12. The electromagnetic head assembly of claim 10 wherein the head positioning unit comprises:
    correction signal generator capable of generating a correction signal based on vibration information received from the vibration sensor; and head position actuator capable of positioning the electromagnetic head according to the correction signal.

13. The electromagnetic head assembly of claim 12 further comprising a vibration limiter capable of limiting vibration frequencies of a chassis whereon the electromagnetic head is mounted in accordance with a frequency response of head positioning.

14. The electromagnetic head assembly of claim 12 wherein the correction signal generator comprises:
vibration signal receiver capable of receiving a vibration indicative signal from the vibration sensor; and
vibration signal processor capable of modifying the vibration indicative signal by applying compensation in order to improve a response of head positioning.

15. The electromagnetic head assembly of claim 12 wherein the correction signal generator comprises:
vibration signal receiver capable of receiving a vibration indicative signal from the vibration sensor; and
vibration signal processor capable of modifying the vibration indicative signal by applying prediction in order to improve a response of head positioning.

16. The electromagnetic head assembly of claim 15 wherein the vibration signal processor comprises:
spectrum analysis unit capable of analyzing a spectral composition of the vibration indicative signal; and
prediction unit capable of predicting a future vibration value according to the spectral composition.

17. The electromagnetic head assembly of claim 10 further comprising:
tape position sensor capable of generating a tape position signal according to the position of the magnetic tape wherein the head positioning unit further is capable of adjusting the position of the electromagnetic head according to the tape position signal.

18. The electromagnetic head assembly of claim 10 further comprising a comparison unit capable of generating a signal that precludes variations in a drive current to the electromagnetic head when the sensed vibration exceeds a pre-established rate of change.

19. A magnetic tape drive comprising:
tape transport mechanism for transporting magnetic tape;
interface module capable of generating a head drive signal according to received data;
electromagnetic head capable of generating a magnetic field according to the head drive signal;
accelerometer that senses vibration imparted to the tape transport mechanism in a control axis; and
head position control system capable of adjusting a position of the electromagnetic head along the control axis according to the sensed vibration so the magnetic tape does not stop but continues to move with respect to the electromagnetic head.

20. The magnetic tape drive of claim 19 wherein the accelerometer is attached to the tape transport mechanism and is capable of generating a vibration indicative signal according to vibration along the control axis.

21. The magnetic tape drive of claim 19 wherein the head position control system comprises:
correction signal generator capable of generating a correction signal based on the vibration indicative signal received from the accelerometer; and
head position actuator capable of positioning the electromagnetic head according to the correction signal.

22. The magnetic tape drive of claim 21 further comprising an isolation mount capable of limiting vibration frequencies of the tape transport mechanism in accordance with the frequency response of head positioning.

23. The magnetic tape drive of claim 21 wherein the correction signal generator comprises:
vibration signal receiver capable of receiving a vibration indicative signal from the accelerometer; and
vibration signal processor capable of modifying the vibration indicative signal by applying compensation in order to improve the response of the head position actuator.

24. The magnetic tape drive of claim 21 wherein the correction signal generator comprises:
vibration signal receiver capable of receiving a vibration indicative signal from the accelerometer; and
vibration signal processor capable of modifying the vibration indicative signal by applying prediction in order to improve the response of the head position actuator.

25. The magnetic tape drive of claim 24 wherein the vibration signal processor comprises:
analog-to-digital converter that creates a digital representation of the vibration indicative signal;
memory capable of storing instructions; digital signal processor capable of executing instruction sequences; and
digital signal processing instruction sequences stored in the memory comprising:
spectrum analysis instruction sequence that, when executed by the digital signal processor, minimally causes the processor to compute a transform of the digital representation, p2 prediction instruction sequence that, when executed by the digital signal processor, minimally causes the digital signal processor to compute a future value of the digital representation according to the transform, and digital-to-analog converter that creates an analog control signal according to the future value of the digital representation.

26. The magnetic tape drive of claim 19 further comprising:
tape position sensor capable of generating a tape position signal according to the position of the magnetic tape wherein the head position control system further is capable of adjusting the position of the electromagnetic head according to the tape position signal.

27. The magnetic tape drive of claim 19 further comprising a comparator that generates a signal that precludes variations in a drive current to the electromagnetic head when a derivative of the sensed vibration exceeds a pre-established value.

28. A tape head positioning system comprising:
means for imparting information onto magnetic tape;
means for supporting the information imparting means;
means for sensing vibration applied to the supporting means; and
means for adjusting position of the information imparting means to compensate for potential errors induced by the vibration so the magnetic tape does not stop but continues to pass across the means for imparting information.

29. The tape head positioning system of claim 28 wherein the vibration sensing means generates an electrical signal according to the vibration experienced by the supporting means.

30. The tape head position system of claim 28 wherein the position adjusting means comprises:
means for generating a correction signal according to vibration sensed by the vibration sensing means; and
means for adjusting the position of the information imparting means according to the correction signal.

31. The tape head position system of claim 30 further comprising means for limiting vibration frequencies imparted to the supporting means in accordance with a frequency response of tape head positioning.

32. The tape head position system of claim 30 wherein the correction signal generating means comprises:
    means for receiving a vibration indicative signal; and
    means for modifying the vibration indicative signal through compensation in order to improve a response of tape head positioning.

33. The tape head position system of claim 30 wherein the correction signal generating means comprises:
    means for receiving a vibration indicative signal; and
    means for modifying the vibration indicative signal through prediction in order to improve a response of tape head positioning.

34. The tape head position system of claim 33 wherein the signal modifying means comprises:
    means for analyzing a spectral composition of the vibration indicative signal; and
    means for predicting a future vibration value according to the spectral composition.

35. The tape head position system of claim 28 further comprising:
    means for sensing the position of the magnetic tape; and
    means for adjusting the position of the information imparting means according to the sensed position of the magnetic tape.

36. The tape head position system of claim 28 further comprising means for precluding variations in a drive current to the electromagnetic head when the sensed vibration exceeds a pre-established level or rate of change.

* * * * *

UNITED STATES PATENT AND TRADEMARK OFFICE
CERTIFICATE OF CORRECTION

PATENT NO.      : 7,268,970 B2                              Page 1 of 1
APPLICATION NO. : 10/719515
DATED           : September 11, 2007
INVENTOR(S)     : James Clifford Anderson et al.

It is certified that error appears in the above-identified patent and that said Letters Patent is hereby corrected as shown below:

In column 18, line 28, in Claim 25, delete "p2" before "prediction".

Signed and Sealed this

Fifteenth Day of July, 2008

JON W. DUDAS
*Director of the United States Patent and Trademark Office*